(12) United States Patent
Glassford

(10) Patent No.: US 6,209,855 B1
(45) Date of Patent: Apr. 3, 2001

(54) GAS/LIQUID MIXING APPARATUS AND METHOD

(75) Inventor: Craig L. Glassford, New Maryland (CA)

(73) Assignee: Canzone Limited, Tortola (VG)

( * ) Notice: Subject to any disclaimer, the term of this patent is extended or adjusted under 35 U.S.C. 154(b) by 0 days.

(21) Appl. No.: 09/307,423

(22) Filed: May 10, 1999

(51) Int. Cl.[7] .................................................. B01F 3/04
(52) U.S. Cl. ........................... 261/28; 261/37; 261/122.1; 210/150
(58) Field of Search ................................ 261/28, 29, 37, 261/42, 122.1, DIG. 70; 210/150, 620

(56) References Cited

U.S. PATENT DOCUMENTS

| | | |
|---|---|---|
| 4,181,604 | 1/1980 | Onishi et al. . |
| 4,268,279 | 5/1981 | Buntemeyer et al. . |
| 4,583,969 * | 4/1986 | Mortensen ........................ 261/122.1 |
| 4,781,889 * | 11/1988 | Fukasawa et al. ................ 261/122.1 |
| 4,818,447 * | 4/1989 | Iwasaki .............................. 261/122.1 |
| 4,857,350 * | 8/1989 | Iwasaki et al. .................... 261/122.1 |
| 4,897,359 * | 1/1990 | Oakley et al. .................... 261/122.1 |
| 4,923,379 * | 5/1990 | Fukasawa et al. ................ 261/122.1 |
| 4,950,431 | 8/1990 | Rudick et al. . |
| 4,971,836 * | 11/1990 | Fukasawa et al. ................ 261/122.1 |
| 5,034,164 | 7/1991 | Semmons . |
| 5,037,610 * | 8/1991 | Fukasawa et al. ................ 261/122.1 |
| 5,254,143 | 10/1993 | Anazawa et al. ......................... 95/46 |
| 5,674,433 * | 10/1997 | Semmens et al. ...................... 261/37 |

FOREIGN PATENT DOCUMENTS

| | | |
|---|---|---|
| 2005959 | 6/1990 | (CA) . |
| 0 470 377 | 2/1992 | (EP) . |
| 0 732 142 | 9/1996 | (EP) . |

* cited by examiner

*Primary Examiner*—C. Scott Bushey
(74) *Attorney, Agent, or Firm*—George A. Seaby (57) ABSTRACT

A method and an apparatus for mixing discrete, microscopic portions of a gas (oxygen) in a liquid (water), wherein the liquid is brought into contact with a liquid repellent side of a microporous membrane, and the gas is contacted with the other side. The membrane, which may be a bundle of hollow fibers, has effective pore pathway diameters generally in the range 0.01 to 5 $\mu$m, and the liquid pressure is regulated not to exceed that of the gas or to cause liquid to pass through the membrane. Gas/liquid mixed in this manner is conveyed and delivered in a low-liquid-turbulence incurring manner to avoid the discrete, microscopic gas portions from combining and provide them with a long retention time in the liquid.

11 Claims, 6 Drawing Sheets

GAS/LIQUID MIXING APPARATUS AND METHOD

This invention relates to a gas/liquid mixing apparatus and method.

BACKGROUND OF THE INVENTION

The use of hollow, microporous fibers for the aeration of waste water containing organic pollutants was proposed many years ago, see for example U.S. Pat. No. 4,181,604, dated Jan. 1, 1980, H. Onishi et al.

More recently, it has been proposed to transfer gas to a liquid in a bubbleless manner using hollow, microporous fibers, see for example U.S. Pat. No. 5,034,164, dated Jul. 23, 1991, M. J. Semmens. The bubbleless transfer of gas into the liquid is highly efficient and reduces the loss or waste of gas significantly. Semmens (column 5, lines 27 to 48) teaches the use of a thin, smooth, chemically resistant, non-porous, gas permeable polymer coating on the exterior surface of a major portion of each fiber to inhibit the accumulation of debris and microorganism which tend to clog the surface through which the gas diffuses under high pressures of 20 to 60 psi on the interior of the fibers, while achieving higher gas transfer rates and preventing the loss of gas in bubbles. Semmens further states that if the fibers are uncoated, the pressure differential, that is, the pressure of the gas in excess of that of the liquid, has to be below 2 psi. To avoid bubbles. However, Semmens (column 4, lines 39 to 42) states that generally speaking a gas pressure of at least 45 psi above the water will be used. Clearly, at low gas pressures where no bubbles were formed, the transfer was not considered adequate, and sufficient gas pressure was thought necessary to transfer trapped liquid out of the file membrane (see column 4, lines 34 to 36). While the device of Semmens is useful, the gas permeable polymer coating necessitates the use of elevated gas pressures, while the relatively low liquid pressures will ultimately limit the achievable dissolved gas concentration.

It has also been proposed in U.S. Pat. No. 4,950,431, dated Aug. 21, 1990, A. J. Rudick et al, to provide an apparatus, for making and dispensing carbonated water, in which $CO_2$, pressurized to 31 psi, from hollow semi-permeable membrane fibers is mixed with chilled municipal water in a carbonator housing. It is stated that as long as the water pressure is equal to or greater than the $CO_2$ pressure inside the hollow fibers, $CO_2$ will be absorbed directly into the water without the formation of bubbles (column 4, lines 13 to 31). The $CO_2$ is provided by an input line having a spring biased spool valve which maintains the interior of the carbonator housing pressurized to the level of the $CO_2$, i.e., 31 psi, and provides the driving force for dispensing the carbonated water (column 4, lines 2 to 8). Further, when the incoming water pressure is greater than 31 psi to the carbonator housing, the carbonator functions as a simple in-line continuous carbonator during a dispenser operation.

Rudick et al is concerned with producing and dispensing carbonated water which will effervesce at atmospheric pressure. Thus, while $CO_2$ may be aborbed directly into the water without formation of bubbles, it is necessary for the absorbed portions of $CO_2$ to be of sufficient size to readily coalesce and effervesce, in the manner of a carbonated beverage, when vented to atmospheric pressure by being dispensed by the Rudick et al apparatus. For this to occur, the carbonated water has to be delivered to the drinking cup in a turbulent state.

While the processes of Semmens and Rudick et al are useful, there is a need to not only further enhance the way that gas is transferred to the liquid, but also to increase the amount of gas available in the liquid by increasing the dwell or residence time during which microscopic portions of the gas remain discrete in the liquid before coalescing and exiting from the liquid in the form of bubbles.

SUMMARY OF THE INVENTION

According to the present invention there is provided a gas/liquid mixing apparatus comprising:
a) a casing having a gas inlet, a liquid inlet, and a gas/liquid mixture outlet,
b) a microporous membrane in the casing, the membrane having,
   i) effective, gas/liquid contacting, pore pathway diameters generally in the range of 0.01 to 5 $\mu$m, and
   ii) a side that is repellent to the liquid to be mixed,
   the membrane dividing the casing interior into a liquid path, on the liquid repellent side, between the liquid inlet and gas/liquid mixture outlet, and a gas chamber from the gas inlet,
c) fluid pressure regulating means connected to the casing to regulate the gas/liquid pressure relationship therein so that,
   i) the gas pressure does not exceed the liquid pressure, and
   ii) pressurized liquid does not pass through the membrane micropores, and
d) a low liquid turbulence incurring, gas/liquid mixture conveying and delivering device connected to the gas/liquid mixture outlet.

In some embodiments of the present invention, a gas outlet is provided from the casing, the microporous membrane is one of a plurality of similar, microporous, hollow fibers bundled together in the casing, a first block of epoxy resin is at one end of the bundle, and seals that end of the bundle, with open ends of the fibers at that end of the bundle communicating with the gas inlet, a second block of epoxy resin is at the other end of the bundle, and seals that end of the bundle with open ends of the fibers at that end of the bundle communicating with the gas outlet, and the gas inlet and gas/liquid mixture outlet are on opposite sides of the casing for liquid to flow across substantially the whole outer surface of the fibers.

The bundle of fibers may comprise the warp of a woven, open mesh structure, and solid, water repellent fibers are provided forming the weft, and the open mesh structure is coiled to form the bundle.

The apparatus may further comprise a tank, and a pump connected to deliver liquid to the liquid inlet, and the low liquid turbulence incurring, gas/liquid mixture conveying and delivering device, is connected to the tank to gently deliver gas/liquid mixture thereto.

Preferably the membrane has a porosity of at least about 10%.

Further, according to the present invention, there is provided a method of mixing gas with a liquid, comprising:
a) bringing a liquid into contact in a casing with a mixing liquid repellent side of a microporous membrane having effective, gas/liquid contacting pore pathway diameters generally in the range 0.01 $\mu$m to 5 $\mu$m,
b) bringing a gas into contact in the casing with the opposite side of the microporous membrane to that contacted by the liquid,
c) regulating the gas/liquid pressure relationship in the casing so that,
   i) the gas pressure does not exceed the liquid pressure, and ii) liquid does not pass through the membrane micropores, whereby discrete, microscopic portions of the gas are brought into contact with the liquid, and d) conveying the gas/liquid mixture thus produced in a low turbulence incurring manner from the membrane to a receiving vessel therefor.

The microporous membrane may be one of a plurality of similar microporous, hollow fibers, and the gas is passed down the hollow fibers, while the liquid is passed over the liquid repellant outer side of the hollow fibers.

Gas/liquid mixture in the receiving vessel may be frozen to increase the retention time of the discrete, microscopic portions of the gas in the liquid.

Preferably the gas pressure is at least 0.07 kg/cm$^2$ less than that of the liquid.

Until the present invention was made, it was not possible to produce discrete, microscopic portions of the gas mixed with the liquid, which would remain stored in the liquid in the discrete form for such long periods of time as to provide a useful novel product which for example, could be used in aerobic or chemical processes to provide oxygen for hitherto unattainable lengths of time without the need of more "forced" means of aeration.

The present invention provides a novel gas/liquid mixture which, when compared to known gas/liquid mixtures, has:

a) a surprisingly greater mass of gas in a given volume of liquid, to the point of supersaturation, and b) exhibits a vastly increased period during which gas remains dispersed in the liquid in discrete portions.

This long dwell time of supersaturated gas in the liquid, in discrete portions is particularly useful in processes which use oxygen consuming microorganisms in water, or chemical reactions accelerated by oxygen, because the excess oxygen provided by supersaturation tends to replace the consumed oxygen before being lost to atmosphere.

One possible explanation of these surprising results may be due to a very large distribution in the liquid through the membrane micropores of discrete, microscopic portions (nano-portions) of the gas. These microscopic portions of the gas, being gently transferred to the liquid in a widely distributed, dense population remain suspended therein in the discrete form for a very long period of residence because of their relatively low buoyancy, compared to bubbles, provided that the gas/liquid mixture is handled gently, that is, with low turbulence. These conditions cannot be achieved if the gas enters the liquid at elevated pressure to that of the liquid because the discrete, microscopic portion of the gas expand and thus increase in buoyancy to rise in the liquid creating turbulence therein, and, because of the dense population, combine to form bubbles which rapidly float upwardly, and escape from the liquid, regardless of how the gas/liquid mixture is handled.

It should be noted that the present invention is described in the following embodiment with the gas and liquid slightly above atmospheric pressure. However, it is within the scope of the present invention for the gas and liquid to be at atmospheric pressure, or even under a vacuum, provided the relationship between the gas and liquid pressures is adhered to, and the gas/liquid mixture is handled gently, that is, not subjected to a turbulence producing pressure changes.

In this specification, "low-liquid turbulence-incurring, gas/liquid mixture conveying and delivering", means that the gas/liquid mixture is handled gently so that at least a major portion of the discrete, microscopic portions of gas remain discrete, for example, the gas/liquid mixture, i) is transported fairly smoothly, ii) is only subjected to gentle pressure changes, if any, and iii) is only caused to impact gently on any surface.

These are design parameters for the apparatus which can readily be taken into consideration by persons skilled in the art.

BRIEF DESCRIPTION OF THE DRAWINGS

In the accompanying drawings which illustrate, by way of example, embodiments of the present invention.

DETAILED DESCRIPTION OF THE PREFERRED EMBODIMENTS

Figure 1:
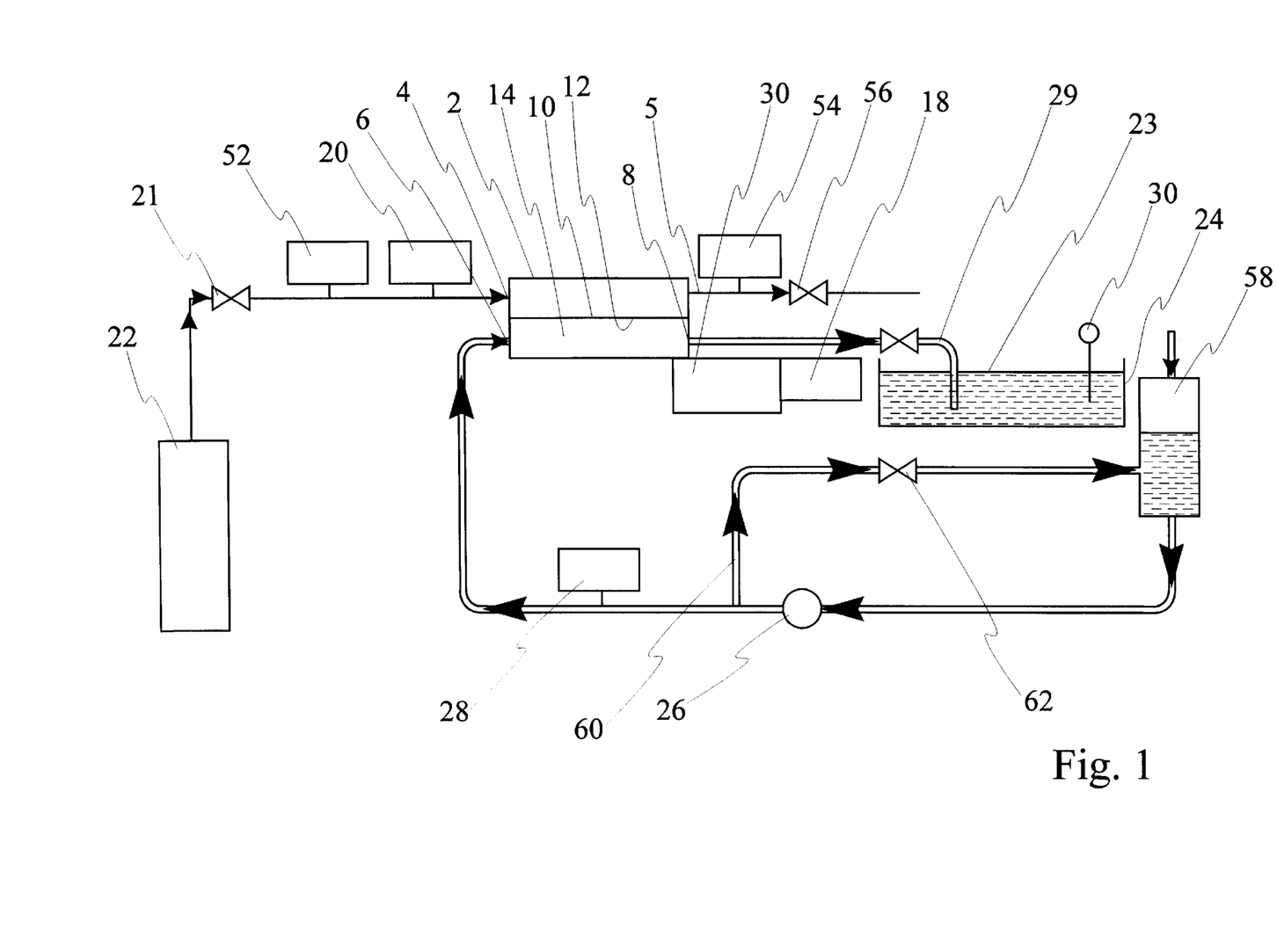
FIG. 1 is a flow diagram of an apparatus used to verify the present invention.

In FIG. 1 there is shown a gas/liquid mixing apparatus, comprising:

a) a casing 2 having a gas inlet 4, a liquid inlet 6 and a gas/liquid mixture outlet 8, b) a microporous membrane 10 in the casing 2, the membrane having,
   i) effective, gas/liquid contacting, pore pathway diameters generally, in the range 0.01 to 5 μm, and
   ii) a side 12 that is repellent to the liquid to be mixed, the membrane 10 dividing the casing interior 14 into a liquid path, on the water repellent side 12, between the liquid inlet 6 and the gas/liquid mixture outlet 8, and a gas chamber from the gas inlet 4, c) fluid pressure regulating means connected to the casing 2, comprising a liquid back pressure regulator and gauge 18, and a gas pressure regulator and gauge 20, for regulating the gas/liquid pressure relationship in the casing 2 so that,
   i) the gas pressure does not exceed the liquid pressure, and
   ii) pressurized liquid does not pass through the membrane micropores, and d) a low-liquid-turbulence incurring gas/liquid mixture conveying and delivery device, in the form of a pipe 29, having a rounded corner and connected to the gas/liquid mixture outlet 8 and terminating below a liquid level 23 of a tank 24 to gently deliver gas/liquid mixture thereto.

The apparatus may also include gas outlets 5 for removing any liquid that may collect in the gas chamber 2. The gas outlet 5 is also useful for connecting two or more casings 2 in series flow.

The apparatus shown in FIG. 1 was used in tests to verify the present invention and included a gas valve 21, a high pressure oxygen cylinder 22, the open-topped, gas/liquid mixture tank 24, forming a receiving vessel for gas/liquid mixture, a variable speed liquid pump 26, a liquid pressure regulator and gauge 28, and a dissolved oxygen analyzer 30. The pipe 29 was transparent to enable observation of the condition of the gas/liquid mixture therein. Gas flow meters 52 and 54 were provided together with a gas valve 56. The liquid feed was supplied from tank 58 and accurately controlled by return line 60 and valve 62.

Figure 2:
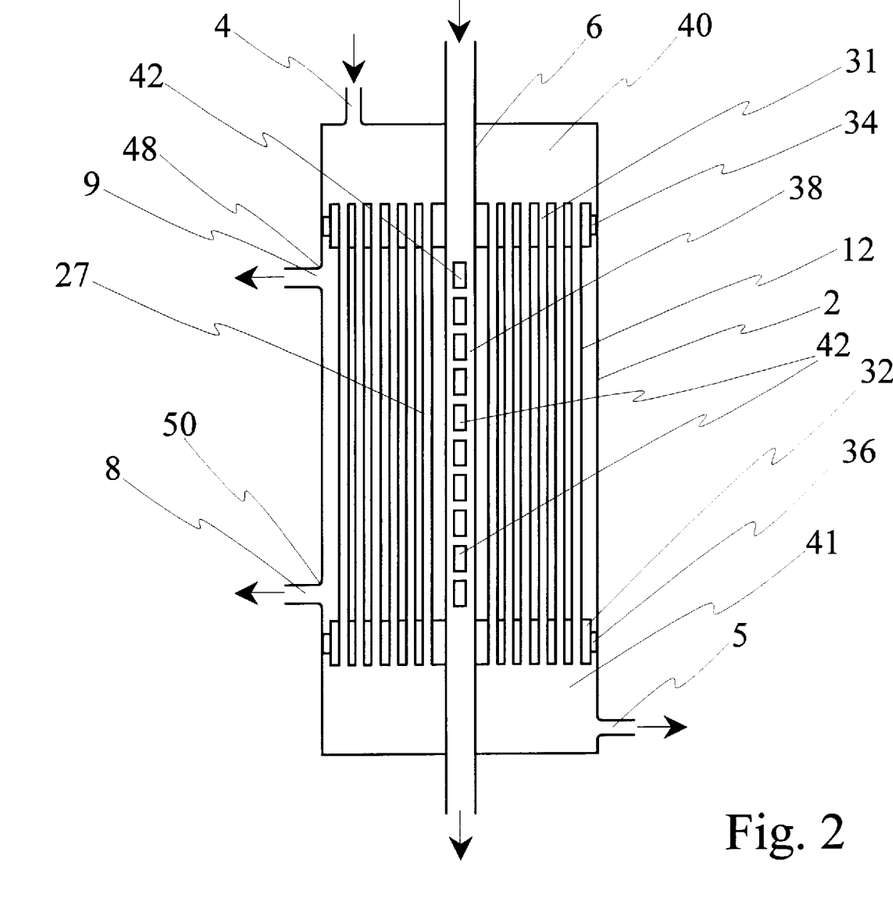
FIG. 2 is a diagrammatic, sectional side view of the gas/liquid contacting device used in the apparatus shown in FIG. 1.

In FIG. 2, similar parts to those shown in FIG. 1 are designated by the same reference numerals and the previous description is relied upon to describe them.

In FIG. 2, the microporous membrane 10 comprises one of a bundle of hollow, microporous fibers 27, each with a liquid repellent outer side 12 and sealed in epoxy resin discs 31 and 32, which, in turn, are sealed in the casing 2 by 'O'-rings 34 and 36 respectively. The assembly comprising the bundle of microporous fibers 27 and discs 31 and 32, are supported by a central support tube 38 which is sealed in the casing and spaces the discs 31 and 32 to provide plenum chambers 40 and 41. Plenum chamber 40 receives gas from inlet 4, while plenum chamber 41 passes gas to outlet 5 to the flow meter 54 (FIG. 1).

The upper ends of the microporous fibers have exposed, open ends above the disc 31, to the plenum chamber 40.

The lower ends of the microporous fibers have exposed, open ends below the disc 32 to the plenum chamber 41.

The central support tube 38 provides the liquid inlet 6 and has liquid outlet ports 42 to the portion of the interior of the casing 2 between the discs 31 and 32.

The gas/liquid mixture outlet 8 is one of two, similar outlets, the other one being designated by reference numeral 9. Both of the outlets 8 and 9 are connected to the pipe 29 (FIG. 1).

In other embodiments, either outlet 8 or 9 is used to recirculate gas/liquid mixture for further gas enrichment.

Figure 3:
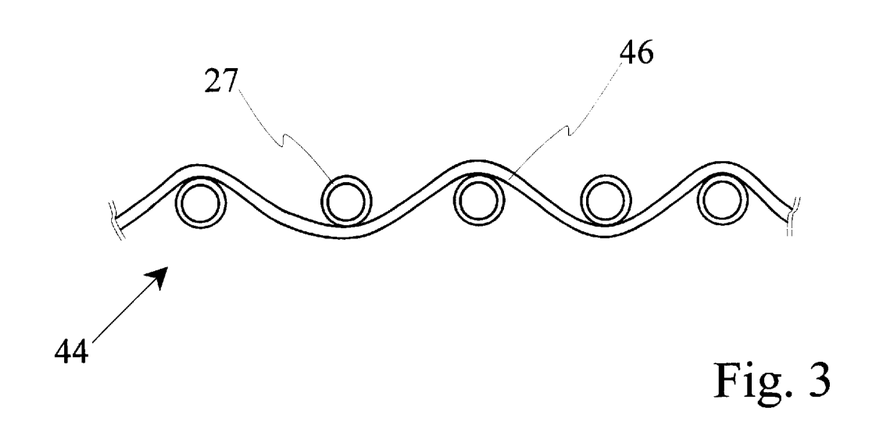
FIG. 3 is an end view of the portion of a bundle of hollow, microporous fibers shown in FIG. 2, before being coiled into the bundle.

In FIG. 3, similar parts to those shown in FIGS. 1 and 2 are designated by the same reference numerals and the previous description is relied upon to describe them.

FIG. 3 shows a portion 44 of the hollow, microporous fibers 27 (FIG. 2) before they are coiled into the bundle. The microporous fibers 27 form the warp of a woven, open mesh structure, with solid fibers 46, of a similar liquid repellent substance to the microporous fibers, forming the weft.

In the tests, in which oxygen gas was mixed with liquid water, the open-topped tank 24 (FIG. 1) had a capacity of 240 L, and was ~90 cm×45 cm×60 cm high.

The hollow, microporous fibers 27 (FIGS. 2 and 3) each had an outside diameter of about that of a fishing line and were made from polyethylene or polypropylene, both of which are water repellent. The size range of the micropores was controlled in the microporous fiber manufacturing process to produce predetermined, effective pathway diameters, through the walls of the hollow, microporous fibers. The gas into liquid breakthrough pressure of the microporous membranes was of the order of 40 psi (2.8 kg per cm$^2$). The specific surface area of the bundle of hollow, microporous fibers was about 3,000 square meters per cubic meter of volume.

More specifically, the following

Table I gives details of two different, polyethylene fibers used in the tests.

TABLE I

| FIBER | ϵp | Do | Di |
|---|---|---|---|
| I | >0.7 | ~540 | ~350 |
| II | >0.7 | ~380 | ~280 |

In Table I,
ϵp is the average porosity of the fibers,
Do is the outside diameter of the fibers in microns, and
Di is the inside diameter of the fibers in microns.

The following Table II gives details of bundled fibres used in modules forming the apparatus shown in FIG. 2 for different tests.

TABLE II

| Module | L | No. | Dc | Dg | FIBRE |
|---|---|---|---|---|---|
| I | 31 | 6400 | 2.667 | 7.79 | I |
| II | 31 | 12800 | 2.667 | 7.79 | II |
| III | 66 | 6400 | 2.667 | 7.79 | I |

In Table II,
L is the length of the fibers in cms,
No is the number of fibers in the bundle
Dc is the inside diameter of the bundle, and
Dg is the outside diameter of the bundle.

In the tests, the pump 26 was supplied with city water via the tank 58 which was a 45 gallon holding tank. Pressurized water was fed from the pump 26 to the inlet 6. Simultaneously, pressurized oxygen was supplied to the inlet 4 with care taken to assure that the oxygen pressure in the casing 2 never exceeded the water pressure. (This would have resulted in large quantities of large oxygen bubbles entering the water and actually reduce the Oxygen transfer rate!) The interfacial area created by the micropores allowed a controlled transfer of oxygen to the water, the driving force for this transfer being the difference in equilibrium oxygen saturation levels between water at atmospheric pressure versus water at elevated pressures. (For example: approximately each atmosphere of oxygen partial pressure that water is exposed to raises its equilibrium oxygen saturation level by 40 ppm.)

All relevant pressures, flows and temperatures were recorded. The oxygen levels exiting at outlets 8 and 9 were monitored by a specially designed dissolved oxygen meter forming analyzer 30, capable of measuring dissolved oxygen under pressure and up to 200 ppm. Inlet water oxygen content was determined prior to each run and was been found to be at saturation levels (8-12 ppm). The oxygen flow was measured by an oxygen mass flow meter forming the meter 52.

A small oxygen purge flow was maintained through the fibres to the outlet 5 to maintain clear passage into the fibre bores, which can become blocked with water if there are any flaws in the disc 31 and 32. If the unit was shut down for more than one hour it was completely drained of water and flushed dry with air. This prevented condensation of water vapour inside the fibres.

The data obtained from the tests was then correlated using standard mass transfer 'numbers' (Sherwood, Reynolds and Schmidt).

Figure 4:
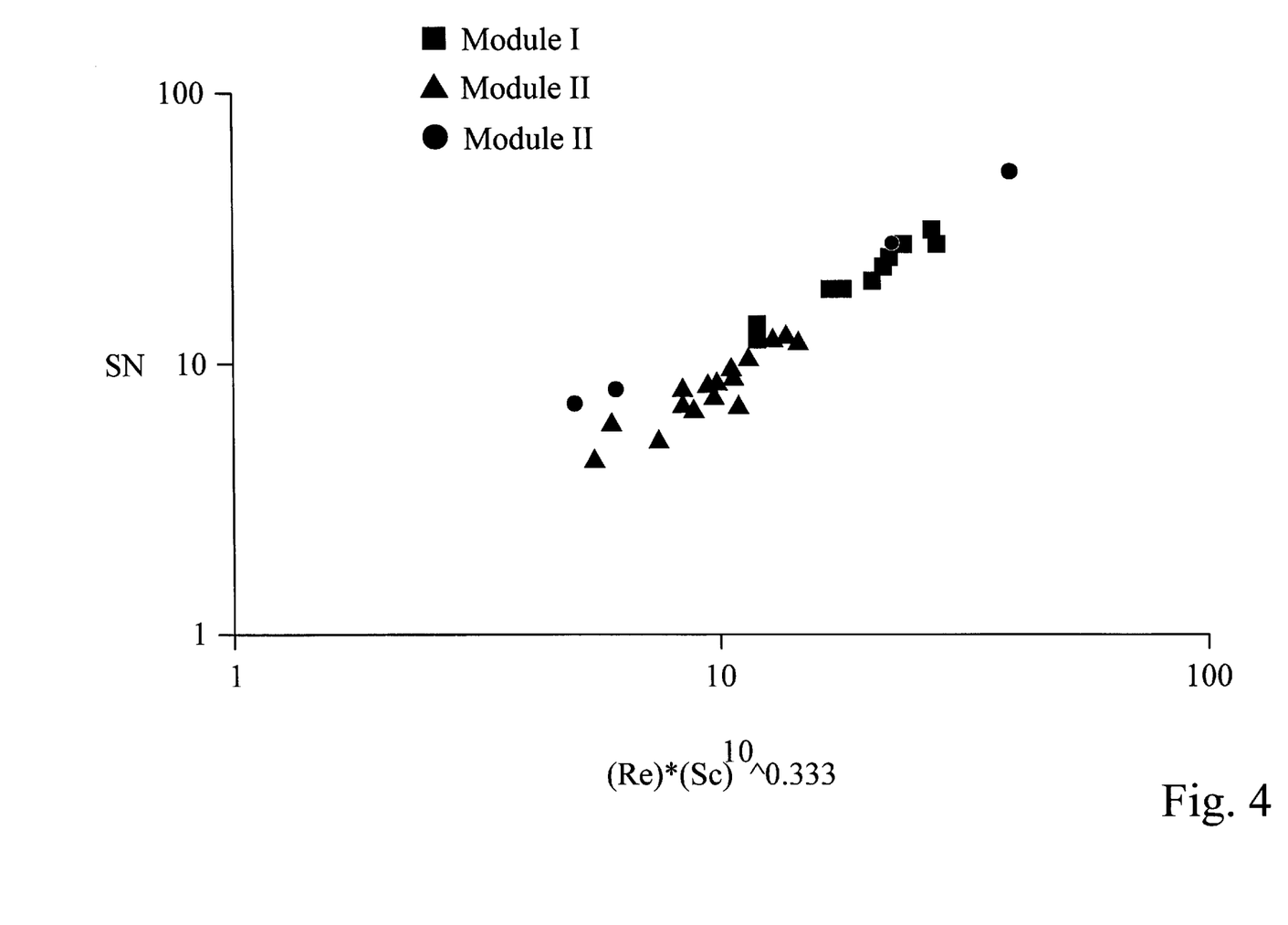
FIG. 4 shows graphs depicting the oxygen transfer data obtained by tests using the apparatus shown in FIGS. 1 to 3.

In FIG. 4,
■ are results using module I,
▲ are results using module II, and
● are results using modue III.

A series of supersaturation decay tests was carried out in which four vessels of various geometries were charged with Highly Oxygenated Water from the previous tests. These vessels were left quiescent for a period of days. Dissolved oxygen contents were closely monitored over this period of time, care being taken to take measurements at consistent depths within the vessels.

Figure 5:
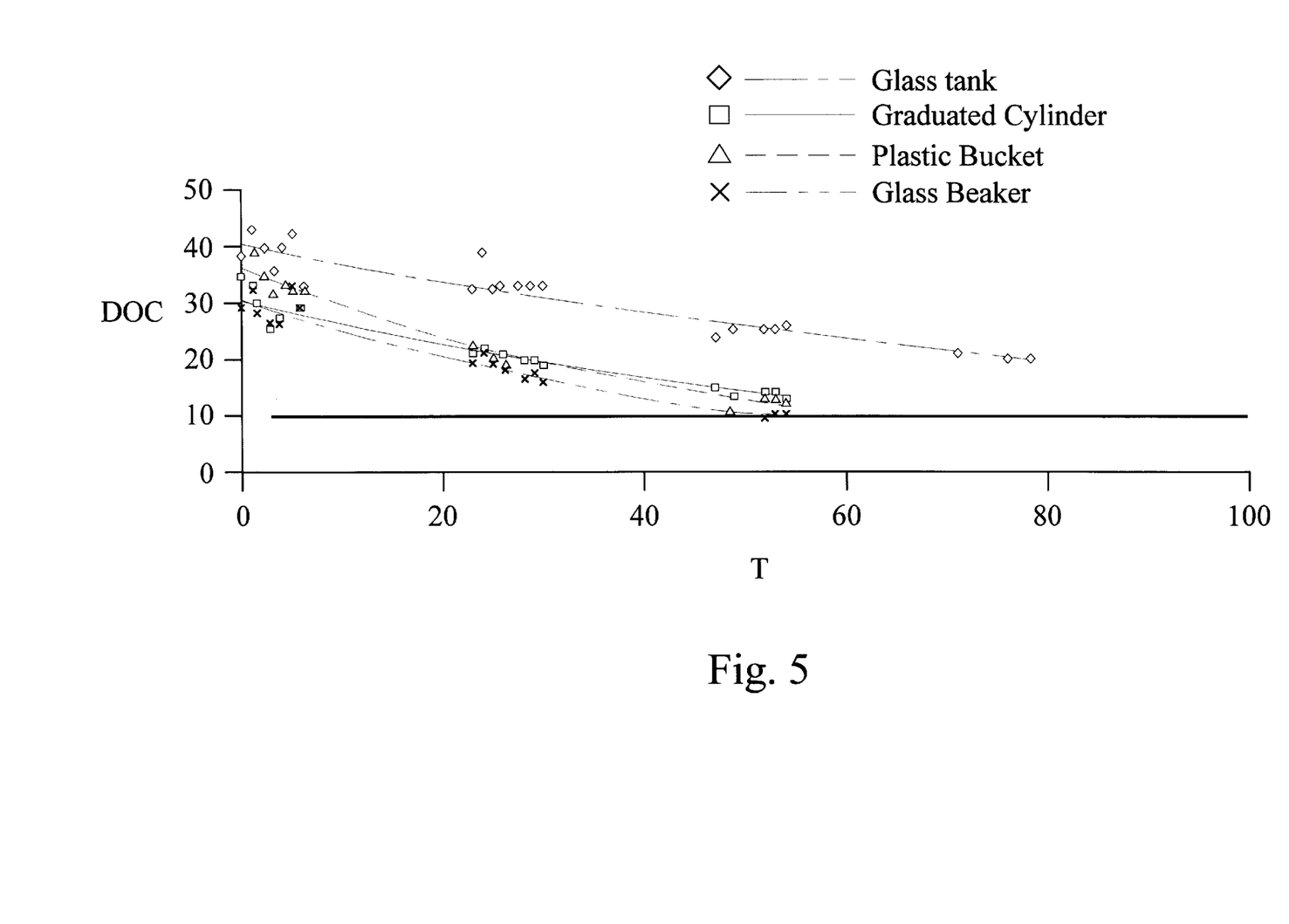
FIG. 5 shows graphs depicting the oxygen content in water plotted against time.

The results of these tests are shown in FIG. 5 where the oxygen content (DOC) in the water in ppm is plotted against the time (T) in hours that the Highly Oxygenated Water has been allowed to remain in the vessel.

In FIG. 5

♦ and — · — represent a glass tank (depth =54 cm),
■ and — — represent a graduated cylinder (depth =38 cm),
▲ and —— represent a plastic bucket (depth =30 cm),
χ — - - — represents a glass beaker (depth =18 cm).

The thick, horizontal line represents saturation level of oxygen in the water.

The tests showed that a significant amount of the oxygen remained in the water for at least two days.

The test results indicated, that gas/liquid contacting apparatus and method according to the present invention is highly efficient, but, surprisingly, once the liquid pressure is reduced, creating a supersaturated condition, the excess gas (oxygen) remains in quasi-solution in the liquid (water). One possible explanation is that this method of gas/liquid mixing, followed by gentle handling, allows the supersaturation to take the form of 'nano bubbles'. These 'nano bubbles' take a long time to find each other and combine to form bubbles large enough and buoyant enough to rise to the surface of the liquid (water). Another surprising result is that excess gas (oxygen) provided in the liquid (water) by the present invention, if the liquid is handled gently, remains therein for such a long time. This long retention of gas (oxygen) in the liquid (water) would be highly beneficial in, for example, gas (oxygen) consuming wastewater treatment or chemical processing where the excess gas (oxygen) would remain in the liquid (water) long enough to replace that being consumed.

In a further test, water that had been supersaturated with oxygen by the previous tests was collected in a flexible container (a domestic balloon) and then frozen. When this frozen, "highly oxygenated water", was placed in a container of deoxygenated city water and allowed to thaw in the balloon, the oxygen content of the city water rose 2 to 3 times more rapidly under one atmosphere of pressure than a similar control container which did not contain a balloon. From this it would appear that supersaturated liquid produced according to the present invention has unique properties that can be used where for example, oxygenation of a liquid is required without the use of pressurized cylinders and powered oxygenation equipment, for example, in the transportation of live fish or seafood.

In yet further tests, liquid that had been supersaturated with oxygen from the previous tests, was used to leach copper from mineral slurries. The results of these tests are shown in the attached FIGS. 5 and 6, wherein copper recovery (CR)% is plotted against time (T) hours that oxygen or air was added to the slurry.

Figure 6:
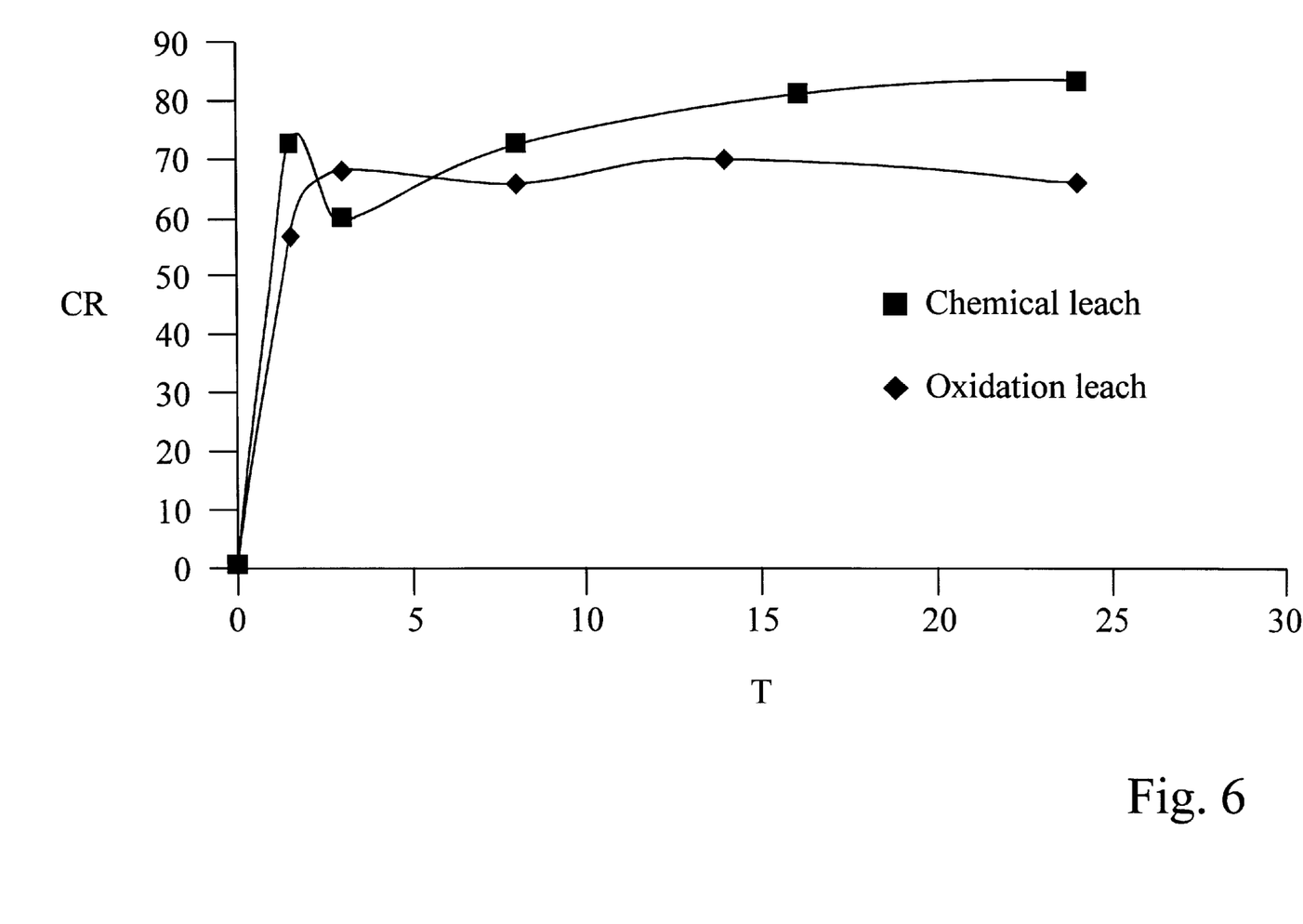
FIGS. 6 and 7 show graphs depicting the extraction of copper from a slurry of mined copper using water saturated in oxygen from the tests whose results are depicted in graphs of FIG. 4.
Figure 7:
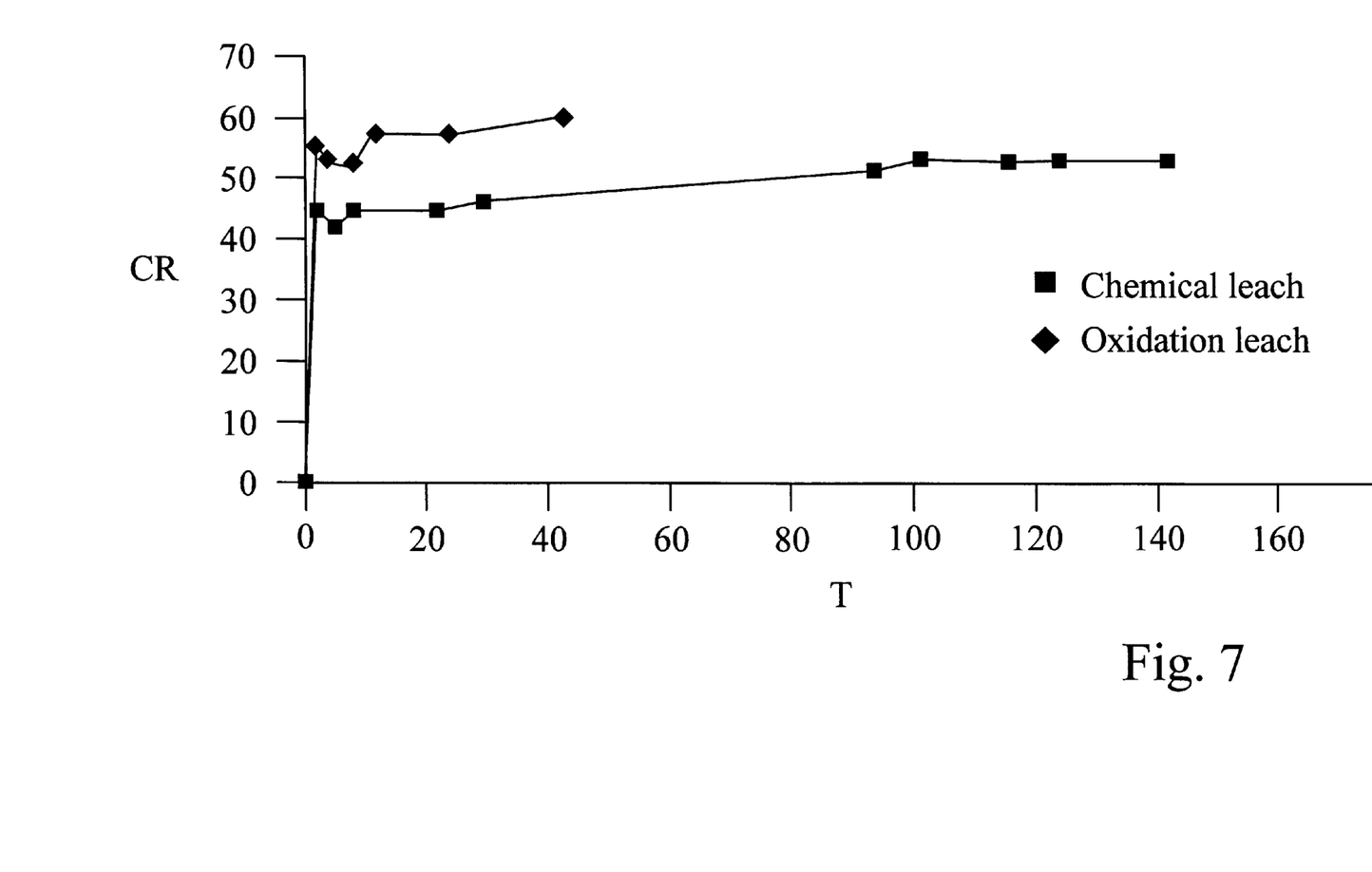

In FIGS. 6 and 7,

■ shows in FIG. 6, the results of the normal acid leaching process, while in FIG. 7, oxidation enhancing ferric sulphate is added to the slurry while air is bubbled through it, and
♦ shows the results of circulating the supersaturated liquid in the slurry, to provide oxygen levels of 35 to 40 ppm in the slurry, instead of bubbling air through it, and without the addition of ferric sulphate.

In the tests of FIG. 6, the supersaturation increased the copper extraction by 27% and reduced the acid consumption by 40%.

In the tests shown in FIG. 7, the supersaturation increased the copper extraction by 25% and reduced the acid consumption by 50%.

Other test results gave some indication of the significant advantages of the present invention over known oxygen/water mixing processes. A large part of the operating cost of any oxygenation process is the power consumption required to transfer the oxygen to the water, and this is also an excellent performance indicator. Power consumption is normally expressed in terms of standard aeration efficiency (SAE), and the units it is expressed in are pounds of oxygen used per hour per applied horsepower, and this is used in the following comparison using a Type III module with liquid flows of 5 to 6 liters per minute and pressure less than 20 p.s.i.

| Mode of Oxygen Transfer | SAE (# $O_2$/hr/hp) |
|---|---|
| Conventional mechanical agitation/surface aeration | ~1.0 |
| Conventional Microbubble diffuses* | ~2.0 to 2.5 |
| Present invention | 14 to 18 |

*Source: Aquatic & Co. Systems, Orlando, Florida, USA.

It should also be noted that in the case of conventional bubble diffusers, a general rule of thumb (obtained from Aquatic & Co Systems), indicates that only ~1% of all the oxygen used is absorbed per foot of tank depth. This means that in a 10 foot tank, 90% of the oxygen used escapes to atmosphere and if pure oxygen is used this represents a significant increase in the cost. By comparison, the present invention does not encounter this problem because the micro portions of oxygen remain in the water for very long periods, in fact the period is sufficiently long for any loss to atmosphere to be negligible in say, processes where the oxygen is consumed.

In other embodiments of the present invention, the hollow, microporous fibers comprise the weft of an open mesh structure.

Preferably, the liquid inlet 6 (FIG. 2) has a rounded corner 48 leading to the interior of the casing 2, and the gas/liquid mixture outlet 8 has a rounded corner 50 leading from the interior of the casing 2.

Other gases which may be used in the present invention are, for example $SO_2$, $O_3$, $N_2$, $CH_4$, $CO_2$, $C_2H_6$, $C_2H_4$, $C_3H_8$, $F_2$ and Cl.

Other liquids which may be used in the present invention are, for example, any acids, bases or hydrocarbons to which the membrane material is repellent.

I claim:

1. A gas/liquid mixing apparatus, comprising,
    a) a casing having a gas inlet, a liquid inlet, and a gas/liquid mixture outlet,
    b) a microporous membrane in the casing, the membrane having,
        i) effective, gas liquid contacting, pore pathway diameters generally in the range 0.01 to 5 $\mu$m, and
        ii) a side that is repellent to the liquid to be mixed, the membrane dividing the casing interior into a liquid path, on the liquid repellent side, between the liquid inlet and gas/liquid mixture outlet, and a gas chamber from the gas inlet,
    c) fluid pressure regulating means connected to the casing to regulate the gas/liquid pressure relationship therein so that,
        i) the gas pressure does not exceed the liquid pressure, and ii) pressurized liquid does not pass through the membrane micropores, and d) a low-liquid-turbulence-incurring, gas/liquid mixture conveying and delivering device connected to the gas/liquid mixture outlet.

2. An apparatus according to claim 1, wherein, a gas outlet is provided from the casing, the microporous membrane is one of a plurality of similar, microporous, hollow fibers bundled together in the casing, a first block of epoxy resin is at one end of the bundle, and seals that end of the bundle, with open ends of the fibers at that end of the bundle communicating with the gas inlet, a second block of epoxy resin is at the other end of the bundle, and seals that end of the bundle, with open ends of the fibers at that end of the bundle communicating with the gas outlet, and the liquid inlet and gas/liquid mixture outlet are on opposite sides of the casing for liquid to flow across substantially the whole outer surface of the fibers.

3. An apparatus according to claim 2, wherein the bundle of fibers comprises the warp of a woven, open mesh structure, solid, water repellant fibers are provided forming the weft, and the open mesh structure is coiled to form the bundle.

4. An apparatus according to claim 1, further comprising a tank, and a pump connected to deliver liquid to the liquid inlet, and the low liquid turbulence incurring, gas/liquid mixture conveying and delivering device, is connected to the tank to gently deliver gas/liquid mixture thereto.

5. An apparatus according to claim 1, wherein the membrane has a porosity of at least about 10%.

6. A method of mixing a gas with a liquid, comprising:

a) bringing a mixing liquid into contact in a casing with a mixing liquid repellent side of a microporous membrane having effective pore pathway diameters in the range 0.01 $\mu$m to 5 $\mu$m, b) bringing a gas into contact in the casing with the opposite side of the microporous membrane to that contacted by the liquid, c) regulating the gas/liquid pressure relationship in the casing so that,
  i) the gas pressure does not exceed the liquid pressure, and
  ii) liquid does not pass through the membrane micropores, whereby discrete, microscopic portions of the gas are brought into contact with the liquid, and d) conveying the gas/liquid mixture thus produced in a low turbulence incurring manner from the membrane to a receiving vessel therefor.

7. A method according to claim 6, wherein the microporous membrane is one of a plurality of similar microporous, hollow fibers, and the gas is passed down the hollow fibers, while the liquid is passed over the liquid repellant outer sides of the hollow fibers.

8. A method according to claim 6, wherein the membrane has a porosity of at least 10%.

9. A method according to claim 6, wherein gas/liquid mixture in the receiving vessel is frozen to increase the retention time of the discrete microscopic portions of the gas in the liquid.

10. A method according to claim 6, wherein the gas pressure is at least 0.07 Kg/cm$^2$ less than that of the liquid.

11. A method according to claim 6, wherein the gas is oxygen and the liquid is water.

* * * * *